United States Patent
Geiss et al.

(10) Patent No.: US 9,616,850 B2
(45) Date of Patent: Apr. 11, 2017

(54) WINDSCREEN AIR DISTRIBUTION SYSTEM

(75) Inventors: Hermann Geiss, Marktoberdorf (DE);
Alexander Zeller, Fuessen (DE);
Andreas Stieglitz, Marktoberdorf (DE);
Patrick Hoerting, Kaufbeuren (DE)

(73) Assignee: AGCO International GmbH, Neuhausen (CH)

( * ) Notice: Subject to any disclaimer, the term of this patent is extended or adjusted under 35 U.S.C. 154(b) by 596 days.

(21) Appl. No.: 14/000,267

(22) PCT Filed: Jan. 11, 2012

(86) PCT No.: PCT/EP2012/050353
§ 371 (c)(1),
(2), (4) Date: Dec. 9, 2013

(87) PCT Pub. No.: WO2012/110266
PCT Pub. Date: Aug. 23, 2012

(65) Prior Publication Data
US 2014/0087647 A1    Mar. 27, 2014

(30) Foreign Application Priority Data

Feb. 17, 2011   (GB) .................................. 1102756.2

(51) Int. Cl.
*B60S 1/54* (2006.01)
*B60S 1/02* (2006.01)
(Continued)

(52) U.S. Cl.
CPC .......... *B60S 1/023* (2013.01); *B60H 1/00207* (2013.01); *B60H 1/00378* (2013.01); *B60H 1/242* (2013.01); *B62D 25/081* (2013.01)

(58) Field of Classification Search
CPC ...................................................... B60S 1/023
(Continued)

(56) References Cited

U.S. PATENT DOCUMENTS 4,007,958 A * 2/1977 Peifer ................ B62D 33/0617
                                                    15/250.001
4,529,242 A * 7/1985 Watanabe ............. B60S 1/0438
                                                    15/250.3

(Continued)

FOREIGN PATENT DOCUMENTS

DE        8620314 U1    9/1986
GB         960974 A     6/1964

(Continued)

OTHER PUBLICATIONS

International Search Report for International Application No. PCT/EP2012/050353 Dated Apr. 23, 2012.

(Continued)

*Primary Examiner* — Steven B McAllister
*Assistant Examiner* — Jonathan Cotov

(57) ABSTRACT

Vehicle cab windscreen air distribution system for a windscreen (1) provided with an external windscreen wiper (5) and a windscreen wiper motor (2a) mounted on the inside of the windscreen. The distribution system comprises an air distribution housing (3) which at least partially surrounds the wiper motor (2, 2a), the housing defining a passage (3a) for the supply of air onto the windscreen (1a) in the vicinity of the motor. The passage (3a) for the supply of air is defined between a motor housing (2) and part of the air distribution housing (3), 2 Claims, 4 Drawing Sheets

(51) Int. Cl.
*B60H 1/00* (2006.01)
*B60H 1/24* (2006.01)
*B62D 25/08* (2006.01)

(58) Field of Classification Search
USPC .......................................................... 454/121
See application file for complete search history.

(56) References Cited

U.S. PATENT DOCUMENTS

| 5,308,279 | A * | 5/1994 | Grinberg | B60H 1/00378 |
| | | | | 454/139 |
| 6,382,712 | B1 * | 5/2002 | Bruss | B60H 1/242 |
| | | | | 296/190.09 |
| 2006/0211358 | A1 * | 9/2006 | Hachmann | B60H 1/00378 |
| | | | | 454/69 |
| 2010/0048118 | A1 * | 2/2010 | Klassen | B60H 1/00828 |
| | | | | 454/140 |
| 2011/0250832 | A1 * | 10/2011 | Mayr | B60H 1/00378 |
| | | | | 454/237 |
| 2012/0003911 | A1 * | 1/2012 | Geiss | B60H 1/00378 |
| | | | | 454/143 |
| 2013/0203333 | A1 * | 8/2013 | Amura | B60H 1/00378 |
| | | | | 454/137 |

FOREIGN PATENT DOCUMENTS

| GB | 1071838 A | 6/1967 |
| JP | 11321568 A | 11/1999 |
| WO | WO2007/035668 A2 | 3/2007 |
| WO | WO2010/066877 | 6/2010 |

OTHER PUBLICATIONS

UK Search Report for GB Application No. 1102756.2 Dated May 11, 2011.

* cited by examiner

WINDSCREEN AIR DISTRIBUTION SYSTEM

TECHNICAL FIELD

This invention relates to an air distribution system for the windscreen of a vehicle cab and in particular for the cab of an agricultural tractor or similar vehicle.

BACKGROUND

Such vehicles typically have an external windscreen wiper mounted in the middle of the windscreen and which is powered by a motor mounted on the inside of the windscreen. The most important part of the windscreen to demist and defrost is the middle part in order for the driver to have a good view of the road or field or any equipment mounted on the front of the vehicle (e.g. a front-loader).

It is known for tractor cabs to have a console arrangement either side of the steering wheel which includes vents for distributing air onto the windscreen and into the cab but such vents have previously not been good at directing air to the middle portion of the screen, especial if the wiper motor interrupts the air stream to the above mentioned windscreen area.

It is an object of the present invention to provide an air distribution system which can conveniently overcome the above problem by supplying air to this middle part of the windscreen.

Thus according to the present invention there is provided a vehicle cab windscreen air distribution system for a windscreen provided with an external windscreen wiper and a windscreen wiper motor mounted on the inside of the windscreen, the distribution system comprising an air distribution housing which at least partially surrounds the wiper motor, the housing defining a passage for the supply of air onto the inside of the windscreen in the vicinity of the motor.

Such a system ensures the supply of air to the middle part of the windscreen in a simple and compact manner. At the same time, the windscreen wiper motor is hidden.

The passage for the supply of air may be defined between a motor housing and part of the air distribution housing.

Alternatively, the passage for the supply of air may be completely defined by the air distribution housing.

The present invention is particularly suitable for vehicle cabs which have windscreens can be pivoted to an open position, the motor moving into a position where it is surrounded by the air distribution housing when the windscreen is in its closed position.

The air distribution housing may also included additional outlets spaced from the motor for the discharge of air into the associated vehicle cab.

BRIEF DESCRIPTION OF THE DRAWINGS

The present invention will now be described, by way of example only, with reference to the accompanying drawings in which.

DESCRIPTION OF EXAMPLE EMBODIMENTS

Figure 1:
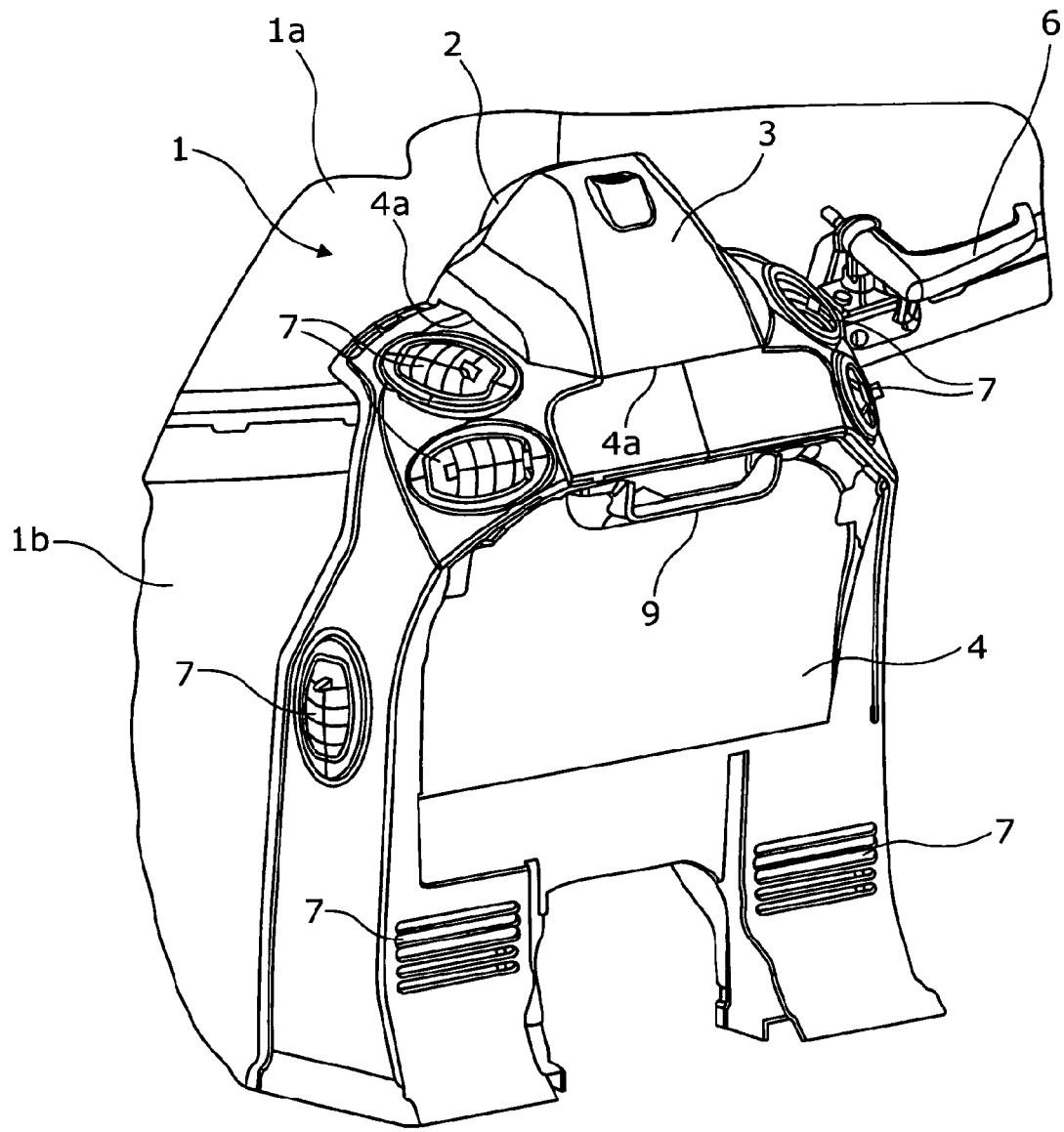
FIG. 1 shows an external perspective view of an air distribution housing in accordance with the invention.
Figure 2:
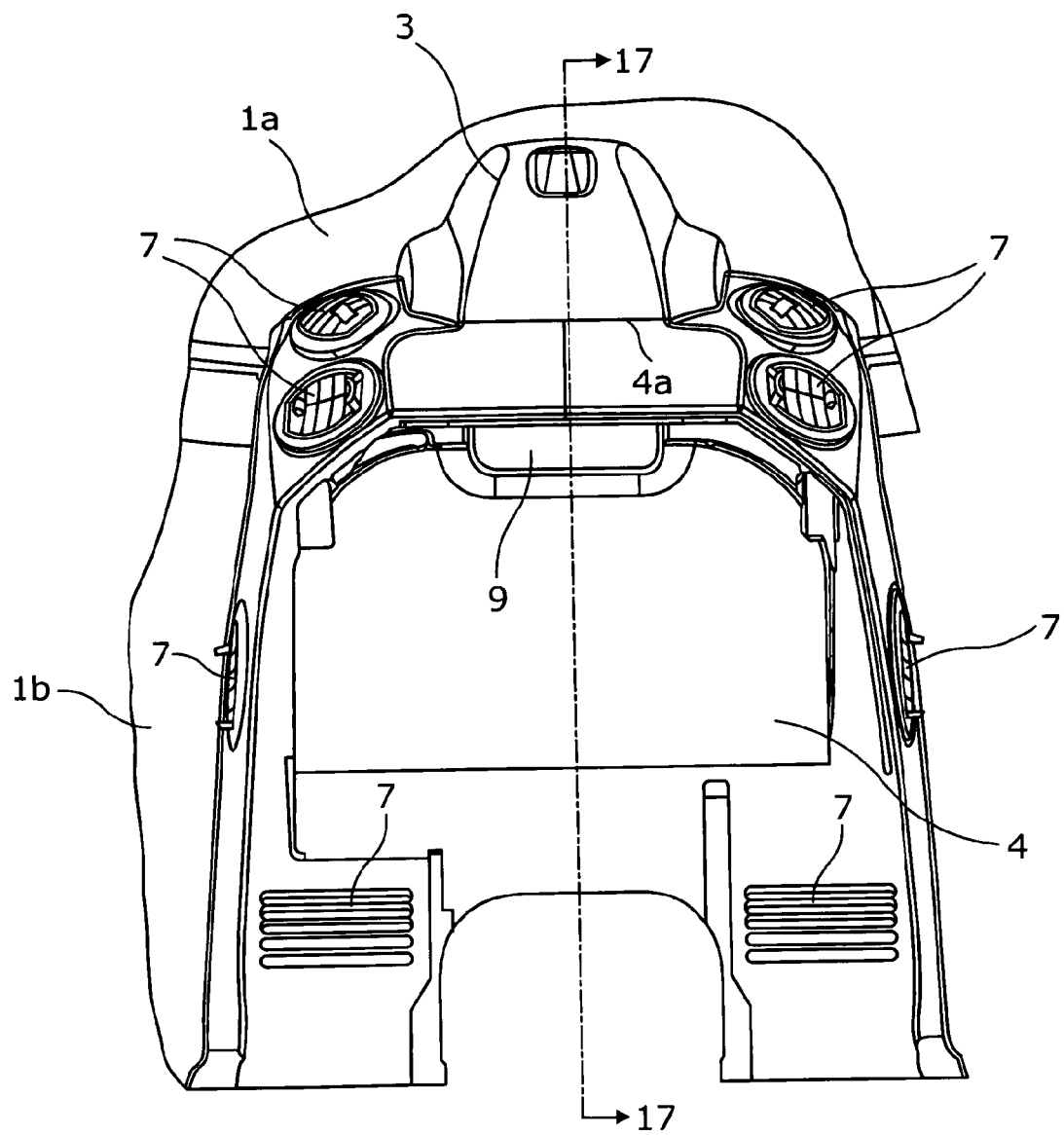
FIG. 2 shows a front view of the housing of FIG. 1.

Referring to the drawings, a tractor cab is provided with a two-piece windscreen 1 with an upper part 1a and a lower part 1b. A motor housing 2 encloses a wiper motor 2a and a gearing 2b which are mounted on the inside of the upper part of the windscreen 1a. A wiper 5 is mounted on the outside of the upper part 1a of the windscreen and is driven by motor 2a and gearing 2b.

As is well known, the upper part 1a of the windscreen is pivotally mounted at its upper edge on the cab so that the windscreen can be pivoted together with the wiper 5, motor 2a, gearing 2b and motor housing 2 to an open position by turning a fastening lever 6 to its open position. The upper part 1a of the windscreen 1 is supported in its open position by a gas spring (not shown).

Figure 3:
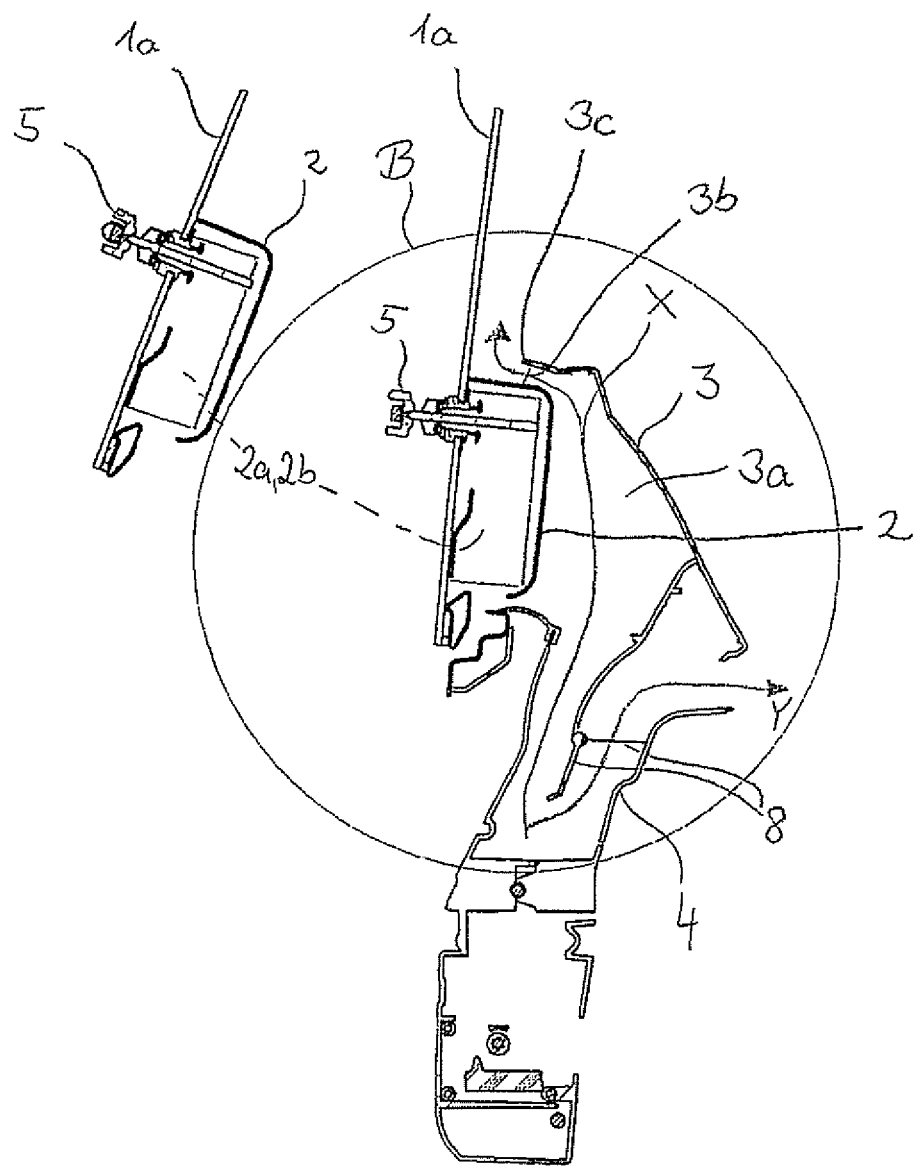
FIG. 3 shows a section along line A-A of FIG. 2.
Figure 4:
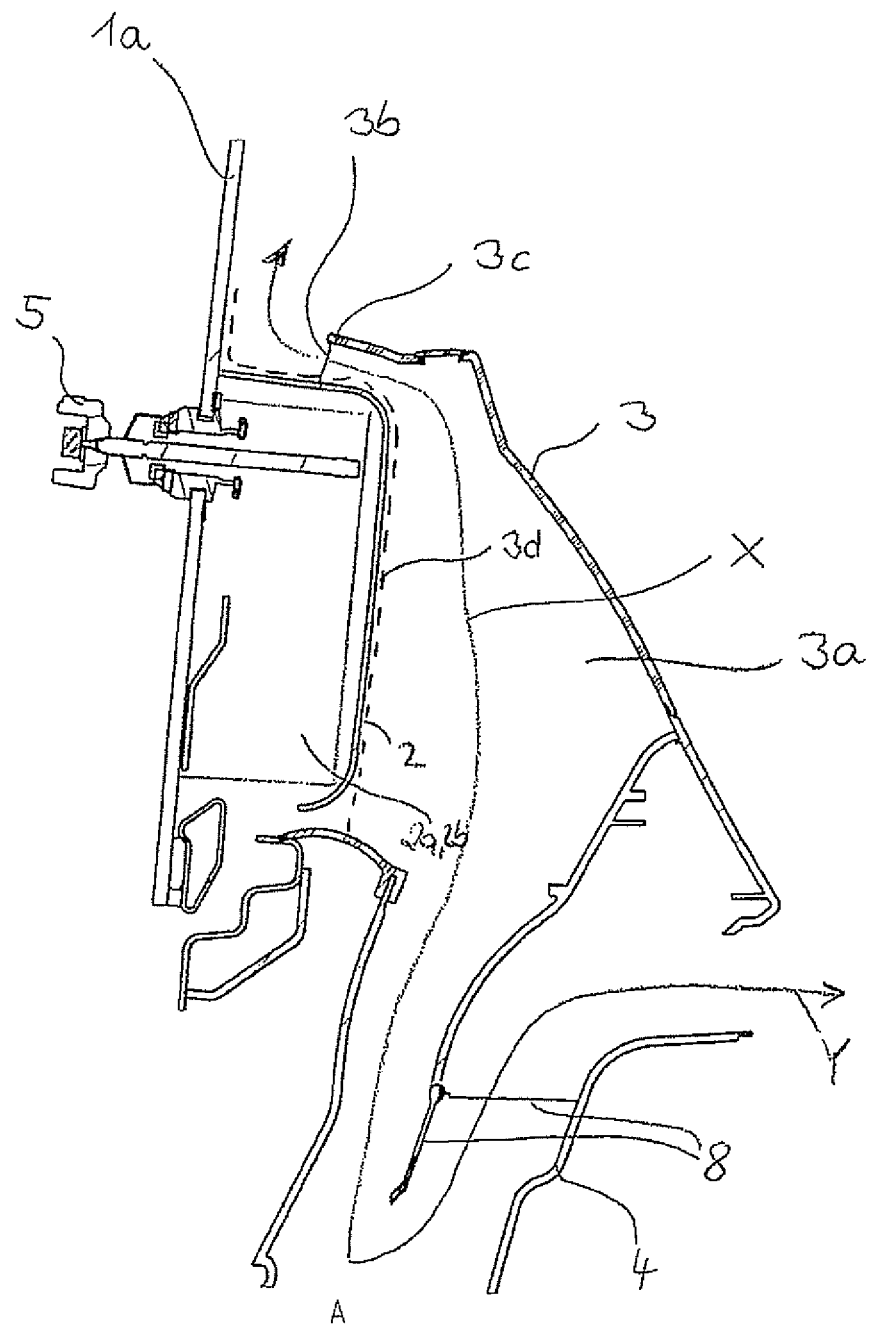
FIG. 4 shows a detail (B) of FIG. 3.

In accordance with the present invention, an air distribution housing 3 is provided which contains a lower part 4 and which partly surrounds the wiper motor housing 2 and defines a passage 3a through which air can flow to the windscreen 1a as shown by the arrow X in FIGS. 3 and 4. As can be seen this air flow exits the housing 3 via the gap 3b between the motor housing 2 and the top edge 3c of housing 3 around the pivot of the wiper and thus air is guided to the windscreen on the inside of the cab. This ensures that the air reaches the middle part of the windscreen as required. Air also exits from the lower part 4 as shown by arrow Y via outlet 9 the flow through which is controlled by flaps 8 which can be moved by the tractor driver or the air ventilating/conditioning system between the full and dotted line positions of FIGS. 3 and 4 to regulate air flow into the cab. Further some slots 7 may be provided in the lower part 4 of the air distribution housing which may be a separate component from the upper housing part 3 along a break line 4a to allow easy access for servicing etc.

FIG. 3 also shows the upper part 1a of the windscreen in its open position 1a' in which the motor housing 2 has been moved away from the air distribution housing 3. Although in the arrangement described above, the air is directed between the outer surface of the motor housing 2 and the inside surface of the air distribution housing 3, the air passage may be define completely by the housing 3 preferably by providing a further inner surface 3d to the housing 3 as indicated in dotted detail in FIG. 4. This alternative arrangement serves to shield the motor to a certain extent from the effects of the hot air which may be passed through passage 3a.

The invention can also be used on a one-piece non-opening windscreen, where it is not necessary, to provide a quick defrosting of the middle part of the windscreen around the windscreen wiper mounting.

The invention claimed is:

1. A tractor cab comprising:
    a windscreen having an external side and an internal side, the windscreen comprising an upper portion and a lower portion, the upper portion of the windscreen being pivotable between a closed position and an open position;
    a windscreen wiper mounted on the external side of the windscreen;
    a wiper motor contained in a motor housing, wherein the wiper motor is mounted on the internal side of the windscreen and pivots with the upper portion of the windscreen; and
    a windscreen air distribution system for the windscreen comprising an air distribution housing, the air distribution housing defining a passage for a supply of air to the internal side of the windscreen, wherein the passage is between an outer surface of the motor housing and an inner surface of the air distribution housing and supplies air onto the windscreen through a gap between the motor housing and the air distribution housing adjacent the wiper motor, wherein the wiper motor moves into a position where it is at least partially surrounded by the air distribution housing when the windscreen is in its closed position to form the gap.

2. The tractor cab according to claim 1 in which the air distribution housing also includes additional outlets spaced from the wiper motor for the discharge of air into the tractor cab.

\* \* \* \* \*